(No Model.)
S. T. HALL.
VALVE FOR STEAM OR WATER.
No. 409,100. Patented Aug. 13, 1889.
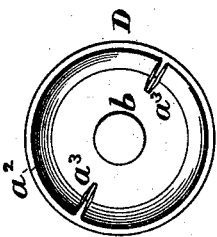
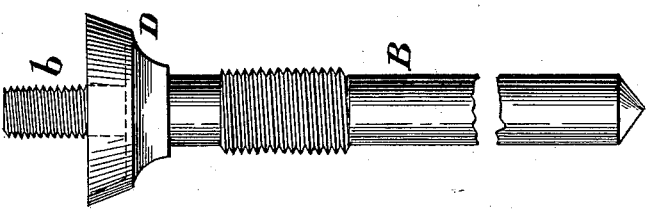
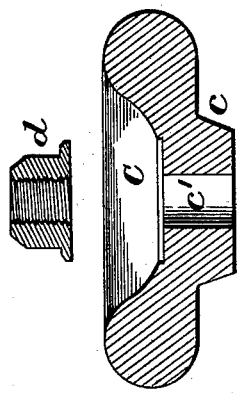
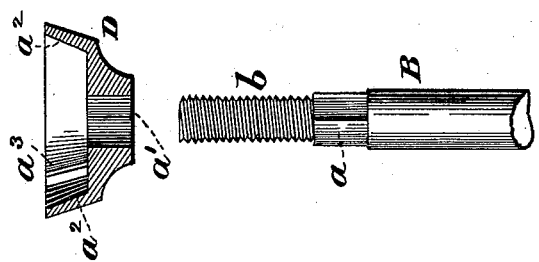
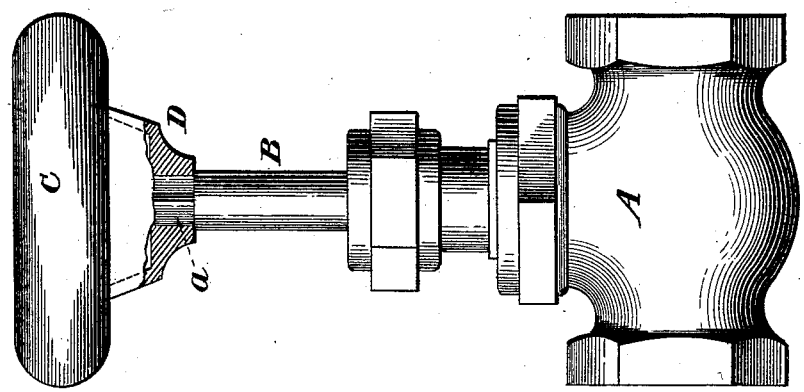
Witnesses:
A. Ruppert.
E. Cruse.
Inventor:
Stephen T. Hall,
by G. H. & W. T. Howard
attys.

UNITED STATES PATENT OFFICE.

STEPHEN T. HALL, OF ST. PAUL, MINNESOTA.

VALVE FOR STEAM OR WATER.

SPECIFICATION forming part of Letters Patent No. 409,100, dated August 13, 1889.

Application filed March 29, 1889. Serial No. 305,293. (No model.)

*To all whom it may concern:*

Be it known that I, STEPHEN T. HALL, of St. Paul, in the county of Ramsey and State of Minnesota, have invented certain new and useful Improvements in Valves for Steam or Water, of which the following is a specification, reference being had to the accompanying drawings, and to the letters of reference marked thereon.

My invention relates more especially to an improvement in a wooden handle for use with a steam or water cock or valve, and to means for securing the said handle to the valve-stem.

In the accompanying drawings, Figure 1 is a view of a valve provided with my improvement. Fig. 2 shows, partly in section, the features entering into my improvement detached. Figs. 3 and 4 are views illustrating a modification, as hereinafter described.

Similar letters of reference indicate similar parts in the respective figures.

It has been found that where a wooden handle is used for the purpose specified it is liable to split by reason of the heat produced in the use of the valve. The object of my invention is to provide means whereby a wooden handle can be conveniently secured to the metallic stem in such way as to render the handle less liable to become destroyed or affected by the action of heat.

A is the body of an ordinary valve for use with steam or water.

B is the valve-stem, and C the wooden handle. As shown in Figs. 1 and 2, the upper part of the stem is provided with a squared portion $a$, above which is a screw-threaded portion $b$. A socket D is provided with a square hole $a'$, which fits over the squared portion $a$, and with a flared or outwardly-tapering portion $a^2$, constituting a ferrule, into which the tapering lower or hub portion $c$ of the wooden handle C fits. The part $a^2$, constituting the ferrule, is preferably provided with one or more internal ribs $a^3$. The center of the wooden handle C has a hole $c'$. In connecting the several parts together the squared hole $a'$ of the socket D fits over the squared portion $a$ of the stem, the threaded portion $b$ of the stem projecting through the hole $c'$ of the wooden handle and receiving the nut $d$, which binds the parts together. The central or hub portion $c$ of the wooden handle C is provided with one or more slits or grooves, which receive the ribs $a^3$ of the stock D. The ribs $a^3$ are, however, not essential to my invention and may be omitted.

Referring to Fig. 3, the socket D is made integral with the stem B, the wooden handle C and nut $d$ being applied as before.

The effect of securing the several parts together in accordance with my invention is to so bind or clamp the wooden handle C that it is less liable to warp, spring, or split when dry or under the action of heat.

My invention is applicable to all classes of valves used in steam engineering or heating.

I am aware that it is not new to provide a valve-stem with an upper threaded portion and an annular flange below the threaded portion, said flange having projections, or a wooden handle with a central aperture through which the threaded portion of the stem passes, and then to secure the two together by clamping the wooden handle between the annular flange and a nut screwed on the threaded portion of the stem, the projections on the flange being embedded in the handle, and such construction I do not claim; but, Having described my invention, I claim—

1. In a steam or water valve, the combination of a threaded stem, a socket having an outwardly-flaring ferrule portion, a wooden handle provided with a central or hub part adapted to enter the ferrule, and a nut screwing upon the threaded portion of the stem to clamp the handle within the socket, substantially as described.

2. In a steam or water valve, the combination of a threaded stem, a socket having an outwardly-flaring ferrule portion provided with one or more internal ribs, a wooden handle having a central or hub portion adapted to enter the ferrule, and with slits to fit the ribs thereof, and a nut screwing upon the threaded portion of the stem to clamp the handle within the socket, substantially as described.

In testimony whereof I have hereunto set my hand and seal.

STEPHEN T. HALL. [L. S.]

Witnesses:
CHAS. V. JOUBERT,
WILLIAM JEFFREY.